United States Patent [19]

Biamonte et al.

[11] Patent Number: 4,766,364
[45] Date of Patent: Aug. 23, 1988

[54] PARALLEL POWER SYSTEMS

[75] Inventors: Robert A. Biamonte, West Hurley; Joseph W. Bogdanski, Saugerties; Kevin R. Covi, Glenford; Herman P. Meyer, Rifton; Daniel I. Rafkind, Kingston, all of N.Y.

[73] Assignee: International Business Machines Corporation, Armonk, N.Y.

[21] Appl. No.: 116,855

[22] Filed: Nov. 4, 1987

[51] Int. Cl.$^4$ .............................................. G05F 1/46
[52] U.S. Cl. ..................................... 323/272; 363/50; 363/65; 307/58; 307/82
[58] Field of Search ............... 323/268, 271, 272, 282, 323/284, 285, 286; 363/50, 65, 71, 72; 307/52, 53, 58, 82, 85-87

[56] References Cited

U.S. PATENT DOCUMENTS

| | | | |
|---|---|---|---|
| 3,824,450 | 7/1974 | Johnson et al. | 323/272 |
| 4,074,182 | 2/1978 | Weischedel | 323/272 |
| 4,174,534 | 11/1979 | Kotlarewsky | 363/72 |
| 4,194,147 | 3/1980 | Payne et al. | 323/272 |
| 4,359,679 | 11/1982 | Regan | 323/272 |
| 4,538,101 | 8/1985 | Shimpo et al. | 323/272 |
| 4,635,178 | 1/1987 | Greenhalgh | 363/65 |
| 4,698,738 | 10/1987 | Miller et al. | 363/65 |

Primary Examiner—Peter S. Wong
Attorney, Agent, or Firm—Joseph J. Connerton

[57] ABSTRACT

A d.c. power supply system comprises a plurality of voltage regulating power supplies connected in a master slave configuration, the number of regulators being one greater than required to provide load current requirements. The master regulator generates a control signal to control the output of the individual slave regulators to provide balanced load sharing. Failure of one of the slave regulators is detected and the failed regulator replaced by the redundant regulator without interference to the output load current. Failure of the master regulator is detected by steering circuitry within each slave which senses an improper master error signal and transfers control to the reference error amplifier circuity of the slave regulators. Diagnosis of the error conditions is provided by logical analysis of output currents.

7 Claims, 4 Drawing Sheets

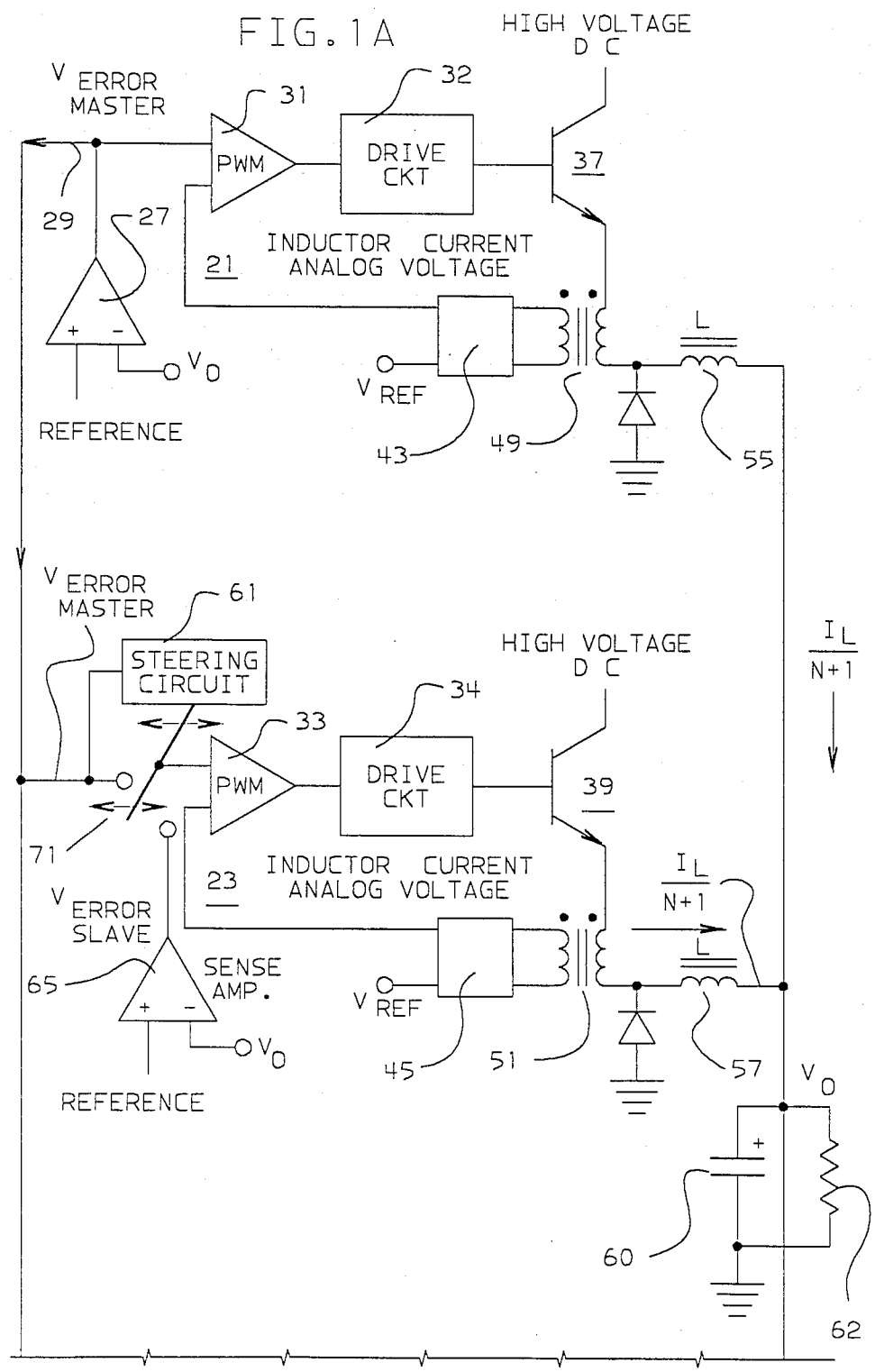

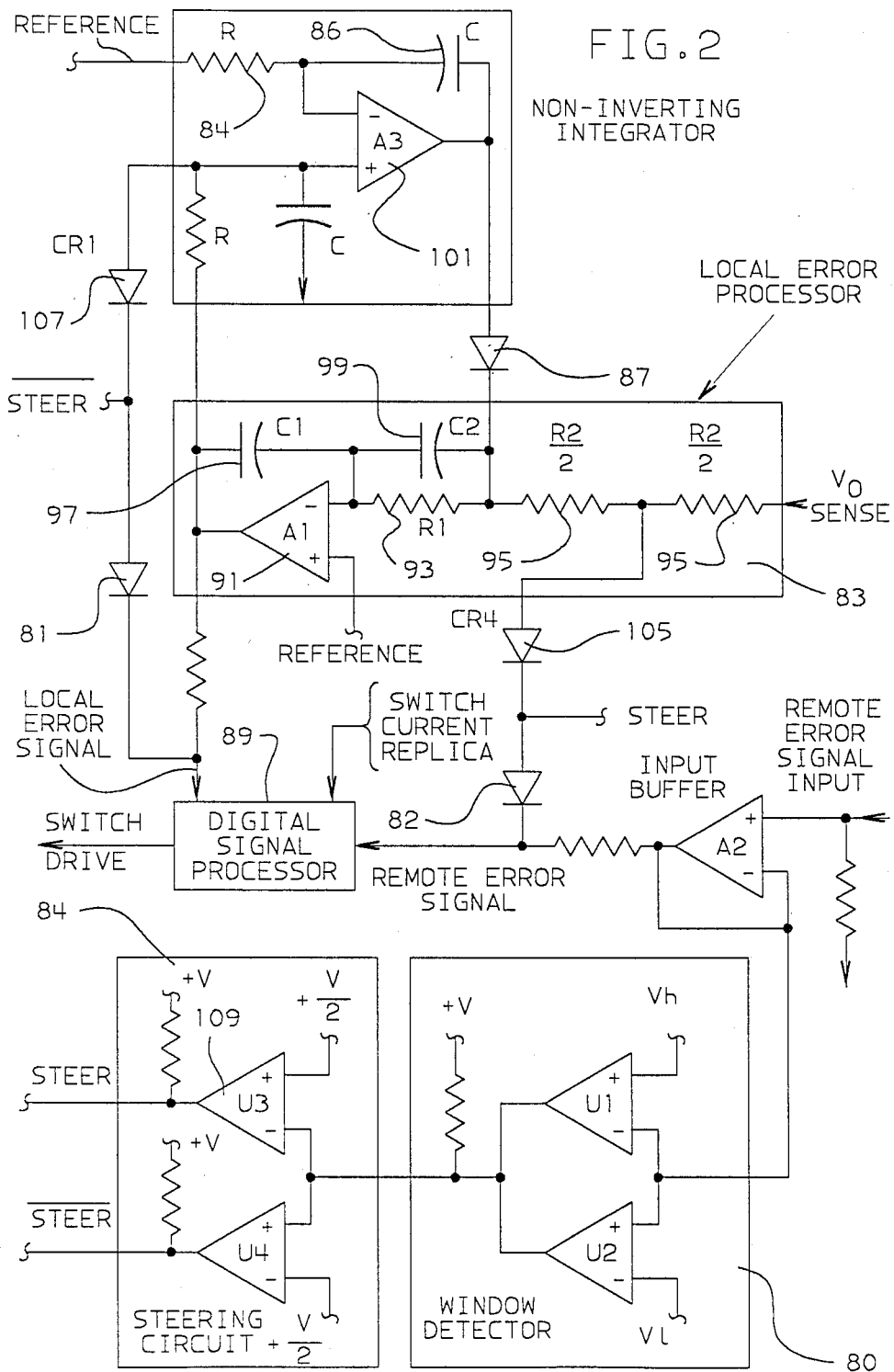

PARALLEL POWER SYSTEMS

FIELD OF THE INVENTION

The subject invention relates to a regulated DC power system and more particularly to a system for identifying and terminating operation of a failed voltage regulator in a redundant power system composed of master and slave voltage regulators without introducing a critical path to the load.

BACKGROUND OF THE INVENTION

In power systems using a configuration of parallel switched mode voltage regulators, the individual regulators share the same control voltage and will provide a substantially equal amount of current to the load. The parallel regulator configuration generally comprises one master or controlling regulator, the remaining regulators being designated slave or controlled regulators. Problems exist upon failure of the master and/or slave regulators, both in providing load current and identifying the specific failed regulator. This is particularly true in the failure of the master or control regulator which generates the error signal for controlling operation of the slave regulators in a parallel regulator configuration. The diagnostic system of the instant invention identifies the failed regulator rapidly and replaces the failed device with a redundant regulator in the system to eliminate down time for the associated power system.

DESCRIPTION OF THE PRIOR ART

U.S. Pat. No. 4,074,182, relates to a d.c. power supply system comprising a plurality of voltage regulator units connected in parallel with a redundant regulator to assume the load automatically if another regulator fails.

U.S. Pat. No. 4,359,679 discloses a load sharing system having parallel switching regulators connected to a common load. The master regulator supplies an error reference signal to the slave regulators in a load balancing arrangement.

C. W. Deisch, IEEE 1978 publication discloses a switching control method for changing an input supply voltage into an output current source.

BRIEF DESCRIPTION OF THE INVENTION

In a system of parallel switching regulators sharing a common load, a redundant configuration of N+1 regulators are connected in parallel, where N is the number of regulators required to supply the load current and all regulators share equally in supplying the load. The parallel switching regulator configuration includes one master regulator and n slave regulators. All regulators contain the basic current mode control circuitry. To achieve current balance among the regulators, the master regulator compares the output voltage to a reference to develop an error signal which is transmitted to all slave regulators. Since the error voltage controls the output from each regulator and all regulators have the same error signal, currents will be substantially balanced among all regulators. Failure of a slave regulator will be identified and compensated for by the redundant regulator, the master regulator adjusting the error signal to itself and all remaining regulators to thereby maintain the output voltage to the load.

Upon failure of a slave regulator, the failure is detected and the master control voltage Ve is increased to a higher level so that each slave is now programmed to provide I/N of the load current vs. the I/N+1 of the total contributed previously. Diagnostic circuitry is incorporated in the system to determine which regulator has failed by checking the output current of the individual regulators. Failure of the master regulator requires that the slaves assume control of their respective outputs. This is accomplished by steering or comparison circuitry in combination with a feedback loop in each slave which senses an improper master error signal and transfers control to the auxiliary error amplifier circuitry of the slave. Each slave regulator in normal operation compares the Ve control signal to predefined voltage limits whereby if the master control voltage Ve is outside these limits, the slave is allowed to assume control of its own inductor current, at the expense of loss of current sharing.

BRIEF DESCRIPTION OF THE DRAWINGS

FIG. 2 illustrates in schematic form a combination of steering and error detection circuitry illustrated in block form in FIG. 1.

DESCRIPTION OF PREFERRED EMBODIMENT

Figure 1B:
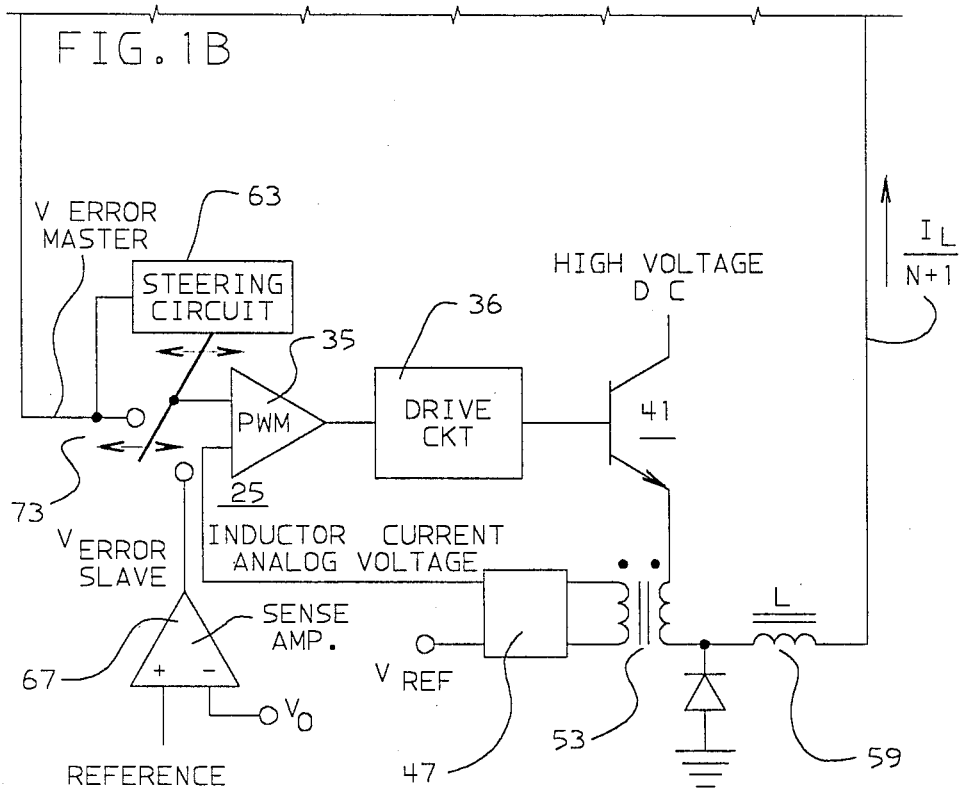
FIG. 1 is a block diagram of a regulated power system constructed in accordance with the instant invention.

Referring now to the drawings and more particularly to FIG. 1 thereof, there is illustrated in block schematic form a preferred embodiment of the present invention. For ease of description, the present invention will be described, by way of example, in terms of one master regulator and two slave regulators, although in practice a configuration could include any number of slave regulators connected in parallel. As is well known in the switching regulator art, and described for example in the referenced Deisch publication, a d.c. voltage is converted to a relatively high frequency current signal in a nominal range of 60–70 KC using switch mode techniques, and reconverted at the load end to a d.c. voltage. Such power conversion is deemed conventional and does not comprise an element of the instant invention. Using current mode switching techniques, the master regulator generates an error signal designated Ve, and this common error signal is supplied to all slaves. A redundant configuration of N+1 regulators are employed, where N is the total number of regulators required to supply the load.

Referring back to FIG. 1, a master switched mode voltage regulator 21 is connected in parallel to slave regulators 23, 25 to provide a total load current $I_L$. Each of the regulators utilize the current mode technique of power train control whereby inductor current peaks in each of the buck regulators are compared to an internally generated control current to determine when conduction of the transistor switches should terminate. The master regulator 21 generates a control signal via switching amplifier 27 which is conducted via line 29 to each of the designated slave power supplies 23, 25.

Each of regulators 21, 23, 25 includes a pulse width modulator 31, 33, 35, a high voltage switch 37, 39, 41 and a switching converter 43, 35, 47 respectively. The outputs of converters 43, 45 and 47 are coupled through transformers 49, 51, 53 and associated filter inductors 55, 57, 59 respectively to provide individual output load currents $I_1/N+1$ to a common load comprising capacitor 60 and resistor 62. Slave regulators 33 and 35 include steering circuits or comparators 61, 63 to compare the voltage Ve from the master to predefined voltage limits specified by the slave. Since this error voltage Ve sets the output current from each regulator and all regulators have in normal operation the same error signal, currents will be balanced. The comparison generated by the slave regulators 23, 25 utilizes sense amplifiers 65, 67 which are connected through switches 71, 73 to comparators 61, 67 which are connected through switches 71, 73 to comparators 61, 63 respectively. Thus, each slave regulator contains its own sense point amplifier and references capable of supplying its own current mode control signals with a voltage (output of sense amplifiers 65, 67) to compare to its inductor current in comparators 61, 63 respectively. Thus, failure of any slave will compensated for by the master regulator adjusting the error signal to itself and all remaining good regulators so as to maintain the correct output voltage.

Should the master produced voltage error signal Ve applied to comparators 61, 63 be outside the above described predefined limits, the slave contained error amplifier circuitry, as more fully described hereinafter, is allowed to control its own inductor current. Failure in the master, however, requires that the slaves assume control. Such failures resulting in extreme control voltages transmitted to slave supplies are thus prevented from affecting the total current produced from the N+1 combination, since N regulators can provide the same total current. This precludes the master error signal from becoming a critical path, i.e., one whose improper operation causes load voltage interruption. This reference signal is used by the slaves and the master as the level to which the inductor current in each power supply is compared as to effect a current mode control at each regulator. Since one common signal level is being used in each supply to determine the magnitude of each regulator inductor current, the inductor current in each supply will be substantially equal within tolerances dictated by the components used.

If the total number of regulators required to supply the load with its required full current is N, then each regulator must be rated for at least 1/Nth the load current. If a given load is to be powered by N regulators each of at least 1/Nth total load amperes, redundancy is provided by adding one additional slave regulators also capable of providing at least 1/N total amperes in parallel with the N power supply initially required. Providing this requirement results in a collection of power supplies of N+1 in number, of which only N are needed to maintain the load.

Normally, each of the N+1 regulators provide only 1/(N+1) of the total load current by virtue of the current mode control technique. Sensing the inductor current of each regulator using conventional techniques and comparing the resultant signal with that of the other regulators will indicate when a slave regulator has failed.

If a slave fails so as to produce a load current contribution greater than 1/(N+1) of the total load current, an analogous response by the master regulator causes the remaining good slave supplies to shunt regulate the increase in available load current from the failed supply. This is achieved because lowering the master derived inductor current comparison voltage reduces the inductor current in the master supply and each properly responding slave supply, and thus shunt regulates the effect of the failed-on slave power supply. The remaining N regulators still function correctly and will each exhibit substantially the same inductor current. Only the failed regulators will exhibit a different inductor current magnitude and so the failing slave power supply can be identified for repair or replacement. Similarly, if a slave fails so that it contributes no load current, an analogous response by the master regulator causes the remaining good slave supplies to shunt regulate the decrease in available load current from the failed supply. The load current is not disturbed and diagnosis of the failed power supply can be made by examining the inductor currents of all supplies to identify the supply with little or no current.

Failures occurring in the master supply are prevented from changing the load voltage while allowing for a proper diagnosis because of extra circuits resident in the slave regulators. As previously described, each slave supply contains its own sense point amplifier and reference capable of supplying its own current mode controls with a voltage to compare to its inductor current. A steering or comparison circuit within each slave combined with a feedback loop compares the aforementioned transmitted signal from the master to predefined voltage limits such that should the master produce voltage be outside these predefined limits, the slave contained error amplifier circuitry is allowed to control its own inductor current. Failures in the master resulting in extreme control voltage transmitted to slave supplies are thus prevented from affecting the total current produced by the N+1 combination of regulators. This eliminates the master regulator error from becoming a critical path, i.e., one whose improper operation interruption causes interruption of the load voltage.

Due to differences in slave control references, some of the slaves when responding to their own internally generated references try to produce maximum current or to produce zero current or some current between the two extremes of their capability. This results in differing inductor currents being sensed which uniquely indicate to the diagnostic control that a problem exists with the master supply. Diagnosis is provided by logical analysis of output currents.

Referring now to FIG. 2, there is illustrated in schematic form the steering circuit of the slave regulators, shown as blocks 61 and 63 in FIG. 1. The disclosed circuit transfers loop control from a remotely generated error signal to a local error signal without producing large voltage transients at the load. As previously described, the regulator system is comprised of a cluster of N+1 switching regulators, N of which can support the load. The regulators employ current mode control and share a common error signal generated by one of the supplies, designed the master, such that each regulator contributes a substantially equal amount of current to the load. Since this error voltage sets the output current from each regulator and all regulators have in normal operation the same error signal, currents will be balanced.

The system prevents a failure of the controlling (master) regulator from causing a disturbance to the load voltage by providing each controlled (slave) regulator with the means to control its own output current. The local feedback loops resident in each slave are ignored by its digital signal processor (DSP) as long as the master error signal is within certain predefined voltage limits. The DSP compares an error voltage with a voltage proportional to the switch current and thereby determines its pulse-width, which in turn, determines the output current of the slave.

Since the internal reference of each slave will never be exactly equal to that of the master, the local feedback circuits in each will tend to saturate far outside the normal voltage regulation range. If loop control is abruptly transferred to a saturated local loop, a large voltage disturbance will almost certainly occur. The disclosed circuit prevents saturation of the "dormant" feedback circuits in addition to its primary function of selecting which feedback signal, local or remote, will control each slave's inductor current.

As is shown in FIG. 2, if the remote master control signal is between the limits of the window detector 80, Vh and Vl, the outputs of the steering circuit designated STEER and $\overline{\text{STEER}}$ will be LOW and HIGH respectively. A single voltage comparator such as steering current 61 (FIG. 1), provides this function. This will cause diode 81 to be ON, pulling the output of Local Error Processor 83 HIGH, while diode 87 will be OFF, allowing the remote error signal Ve to reach the Digital Signal Processor (DSP) 89 undisturbed. DSP 89 is designed such that the lowest error signal controls the inductor current. Forcing the local error signal HIGH results in its being ignored by the DSP.

The Local Error Processor 83 consists of amplifier 91, resistors 93 and 95 and capacitors 97 and 99, configured as an inverting integrator to provide the negative feedback necessary for closed loop operation. Amplifier 101 is configured as a non-inverting integrator, the input of which senses the output of amplifier 91 and the output of which is connected to the input of the inverting integrator through diode 87. Thus, a negative feedback loop is formed around Local Error Processor 83, the bandwidth of which is determined by the RC time constant of resistor 84 and capacitor 86 the non-inverting integrator 101. As long as diode 105 is ON and diode 107 OFF, diode 87 is forward biased with a DC current that flows through one resistors 95, diode 87, and diode 105 into amplifier 109 in steering circuit 82. With diode 87 ON, amplifier 101 will regulate the output of amplifier 91 to the reference voltage. Since A1, amplifier 91 also uses the same reference, a steady state condition is reached wherein capacitors 97 and 99 are completely discharged. Furthermore, if the reference voltage is chosen to be the midpoint of the linear operating region of the error signal, then the Local Error Processor 83 will be optimally biased.

If the remote control signal Ve goes outside the limits of the window detector 80, as would occur if the master regulator failed, the steering circuit switches states and STEER is now HIGH and $\overline{\text{STEER0}}$ is LOW. Diode 81 is reverse biased, thereby freeing the local error signal, while diode 82 is forward biased, and the "bad" remote control signal Ve is pulled up out of the way so that the Digital Signal Processor 89 can ignore it. Since $\overline{\text{STEER0}}$ is LOW, diode 107 is ON, and the positive input of amplifier 101 is pulled below the negative reference, thereby causing amplifier 101 to saturate LOW. Diode 87 is then reverse biased, thereby effectively disconnecting amplifiers 101 from the Local Error Processor 83. Finally, with STEER HIGH, diode 105 is reversed biased, allowing the sense voltage Vo to transfer into the Local Error Processor 83.

This transfer of control from one loop to another occurs instantaneously as compared to the switching period, so that the DSP is always receiving a closed loop feedback signal. Since the local error processor 83 is not allowed to saturate, steady state is reached without any overshoot. The above disclosed circuit is a requirement to a clean transition from remote to local control, and as such, is essential to the realization of the redundant power system.

If this regulator system described above is to be used in a redundant manner, it must be ensured that a failure of the controlling or master regulator does not result in a disturbance to the load voltage. The above described system achieves this, whereby each controlled or slave regulator compares control signal Ve to predefined voltage limits such that should Ve be outside these limits, each slave is allowed to control its own inductor current. Under this condition, all regulators will be in either the current limit or active off state except for the one that is actually regulating the output voltage.

It has been observed that, in certain situations, a failure of a slave regulator can result in a functional master regulator appearing as failed to the remaining slaves. Upon failure of a slave regulator, the master control voltage Ve rapidly increases to a higher level so that each slave is now programmed to provide 1/N of the load current versus the 1/(N+1) of the total contributed previously. The rate at which each regulator can respond to sudden changes in Ve is inversely proportional to its filter inductance. If the bandwidth of the control loop of a slave regulator exceeds that of the output filters, as is usually the case, the inductor currents lag behind Ve until steady state is reached. Meanwhile Ve becomes saturated to its highest level, causing each slave to no longer follow the master but to revert to internal control.

If the internal reference voltage of the master Ve is above that of the controlling slave, Ve will remain saturated high because the master control loop desires to cause an increase in the load voltage but cannot, as the slave regulators are ignoring Ve.

Due to the nature of the diagnostic scheme described supra, the master regulator may be incorrectly diagnosed as having failed, while the failed slave regulator which initially caused the problem will remain undetected since it will be assumed to be in an active off state. As soon as the supposedly failed master is removed for replacement, the load can no longer be satisfied as there are only N−1 functioning regulators remaining.

Figure 3:
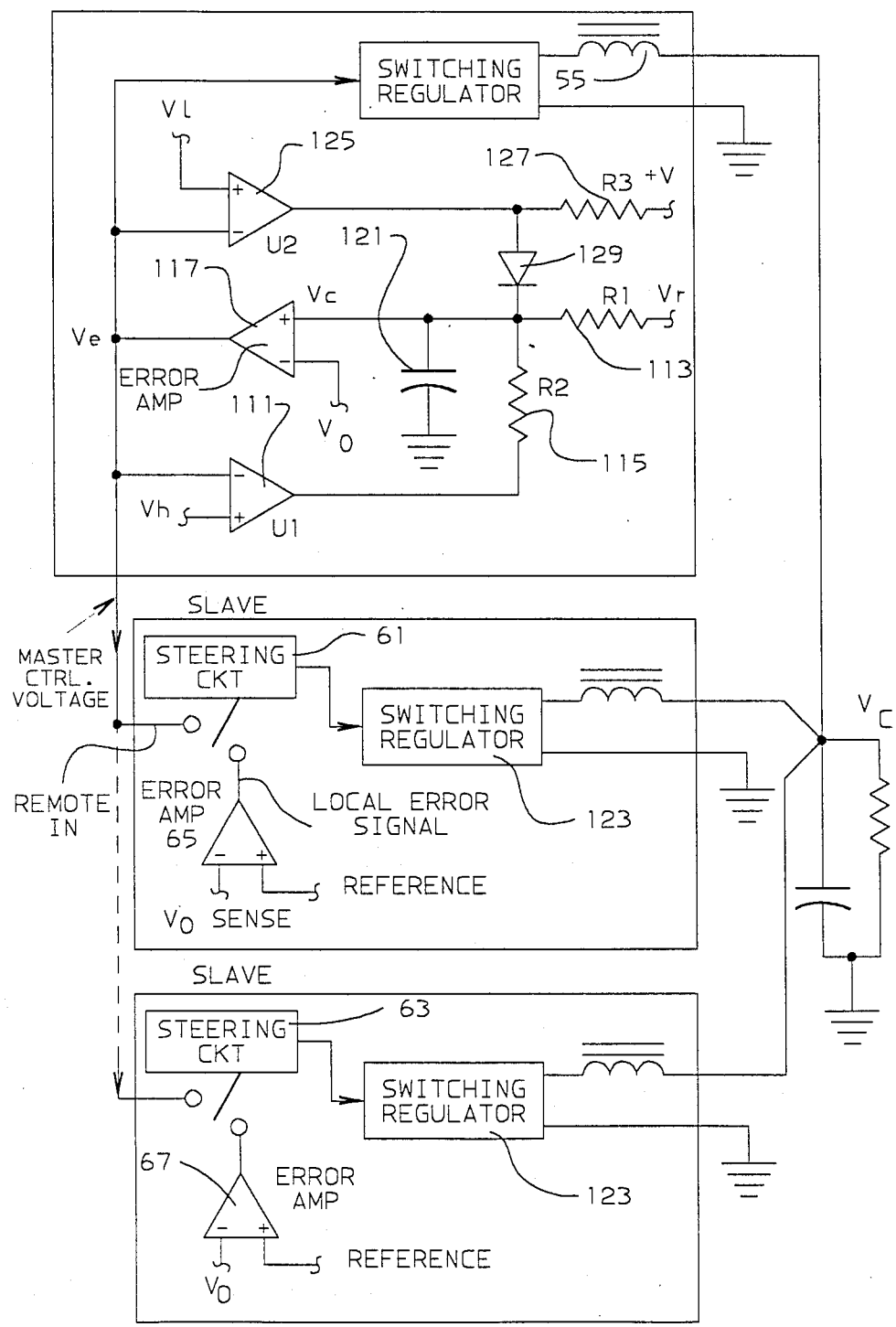
FIG. 3 illustrates in block schematic form an aspect of the instant invention adapted to distinguish between a failed master and a failed slave regulator.

The circuit configuration of FIG. 3 prevents the master control loop from becoming latched up in either the high or low state. Thus, as long as the master is functional, equal current sharing is guaranteed. Conversely, lack of current sharing will be a positive indication of a failed master regulator.

Referring now to FIG. 3, Ve is compared to the same predefined voltage limits employed by each slave, denoted as Vh and Ve, such that should Ve increase above Vh or decrease below Vl, Ve can be adjusted lower or higher respectively. If Ve becomes latched up high as described above, comparator 111 switches on, thereby lowering Vc by the divider action of resistors 113 and 115. The error voltage Ve, as seen by the error amplifier 117 now becomes negative (Vc less than Vo), and Ve decreases. As soon as Ve becomes less positive than Vh, comparator 111 switches off and capacitor 121 slowly charges back to the reference voltage Vr. Simultaneously, the slave regulators 123 revert back to master control, thereby reestablishing equal load sharing. The failed slave can now be positively identified by observing that its' inductor current is zero.

Similarly, if Ve decreases below Vl, as during a sudden load reduction, the slaves will no longer follow Ve but begin to control their own inductor currents, and current sharing will cease. If the master reference Vr happens to be lower than that of the controlling slave, Ve will remain saturated low, since voltage Ve is now negative. Comparator 125 switches off however, and current from +V begins to charge capacitor 121, as allowed by resistor 127 and diode 129. Once Vc exceeds Vo, the voltage Ve becomes positive, rising above Vl. Capacitor 121 now discharges to the level Vr since comparator 125 is now on, and the slave regulators resume equal load sharing with the master as before.

While the invention has been particularly shown and described with reference to a preferred embodiment thereof, it will be understood by those skilled in the art that various changes in form and detail may be made therein without departing from the spirit and the scope of the invention.

What is claimed is:

1. A regulated voltage D.C. power system comprising, in combination,
   a master switching regulator for providing an output to a load,
   a plurality slave switching regulators connected in parallel with said master regulator to supply said load,
   said master and slave switching regulators comprising a redundant configuration of N+1 switching regulators wherein each of said regulators contributes a substantially equal amount to said load,
   said master switching regulator having a current mode control circuit operative to compare the output signal from said master switching regulator with a reference to generate an error signal,
   each said slave regulator also having a current mode control circuit, and
   means responsive to the failure of said master switching regulator to transfer control from said master to said slave regulators while maintaining a stable output to said load.

2. A system in accordance with claim 1 wherein said master and slave switching regulators include a feedback loop from said load whereby each of said slave switching regulators can control its own output current upon failure of said master switching regulator.

3. A system in accordance with claim 1, wherein each of said slave regulators has an individual auxiliary error signal feedback means switchable into operation to control the respective slave regulator upon failure of said master switching regulator.

4. A system in accordance with claim 2, wherein said failure of said master switching regulator is detected in terms of excursion of said master error signal outside predetermined limits.

5. A system in accordance with claim 1, wherein said current mode control of said master switching regulator comprises a pulse width modulation technique.

6. A system in accordance with claim 1 wherein said current control of said slave switching regulators comprises a pulse width modulation technique.

7. A system in accordance with claim 1 wherein failure of one of said slave switching regulators is compensated by said redundant configuration.

* * * * *